(12) United States Patent
Murakami et al.

(10) Patent No.: US 10,183,646 B2
(45) Date of Patent: Jan. 22, 2019

(54) OCCUPANT RESTRAINING APPARATUS

(71) Applicant: JOYSON SAFETY SYSTEMS JAPAN K.K., Tokyo (JP)

(72) Inventors: Yoshiki Murakami, Shiga (JP); Hiroaki Isozaki, Shiga (JP); Tatsuya Higuchi, Shiga (JP); Yongliang Huang, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 45 days.

(21) Appl. No.: 15/585,823

(22) Filed: May 3, 2017

(65) Prior Publication Data

US 2017/0327075 A1    Nov. 16, 2017

(30) Foreign Application Priority Data

May 13, 2016  (JP) .................................. 2016-097124
Aug. 18, 2016  (JP) .................................. 2016-160666

(51) Int. Cl.
*B60R 21/18* (2006.01)
*B60R 22/18* (2006.01)
*B60R 21/201* (2011.01)

(52) U.S. Cl.
CPC ............. *B60R 22/18* (2013.01); *B60R 21/18* (2013.01); *B60R 21/201* (2013.01); *B60R 2022/1812* (2013.01); *B60R 2022/1818* (2013.01)

(58) Field of Classification Search
CPC .................. B60R 21/18; B60R 21/201; B60R 2022/1818; B60R 2022/1812
See application file for complete search history.

(56) References Cited

U.S. PATENT DOCUMENTS

2014/0151986 A1*   6/2014   Kim ...................... B60R 21/18
                                                                280/733

FOREIGN PATENT DOCUMENTS

| DE | 10 2011 055 068 A1 | 12/2012 | |
|----|--------------------|---------|----|
| EP | 2666676 A1 * | 11/2013 | ............. B60R 21/18 |
| EP | 2 666 676 B1 | 7/2015 | |
| JP | 4331853 B2 | 9/2009 | |
| JP | 2013-184559 A | 9/2013 | |
| WO | WO-2015190152 A1 * | 12/2015 | ............. B60R 21/18 |

* cited by examiner

*Primary Examiner* — Karen Beck
(74) *Attorney, Agent, or Firm* — Foley & Lardner LLP

(57) ABSTRACT

According to one embodiment, an occupant restraining apparatus includes a webbing W, a tongue 4, an airbag 20 provided along the webbing W, a bag cover 40 surrounding the airbag 20, and a webbing guide 30 through which the webbing W is passed. The webbing guide 30 extends continuously from one end to the other end of the bag cover 40. The lower end of the bag cover 40 surrounds the lower end of the webbing guide 30, and the lower end of the bag cover 40 and the lower end of the webbing guide 30 are bound together. The upper end of the bag cover 40 surrounds the upper end of the webbing guide 30, and the upper end of the bag cover 40 and the upper end of the webbing guide 30 are bound together.

8 Claims, 12 Drawing Sheets

OCCUPANT RESTRAINING APPARATUS

CROSS REFERENCE TO RELATED APPLICATIONS

This application is based upon and claims benefit of priority from the Japanese Patent Application No. 2016-97124, filed on May 13, 2016, and the Japanese Patent Application No. 2016-160666, filed on Aug. 18, 2016, the entire contents of which are incorporated herein by reference.

FIELD

The present invention relates to an occupant restraining apparatus that restrains a vehicle occupant with a webbing in an emergency. Specifically, the present invention relates to an occupant restraining apparatus that has a bag (airbag) inflatable along a webbing and that is also referred to as an airbelt. More specifically, the present invention relates to an occupant restraining apparatus in which an airbag is disposed along a webbing, the webbing is slidably passed through a webbing guide provided along the airbag, and the airbag is surrounded by a bag cover made of fabric or the like.

BACKGROUND

Seat belt apparatuses that take up a webbing to restrain a vehicle occupant in an emergency of a vehicle include a seat belt apparatus in which an airbag is provided along a webbing, and the airbag is inflated with gas in an emergency of a vehicle. This seat belt apparatus is sometimes referred to as an airbelt apparatus.

Japanese Unexamined Patent Application Publication No. 2001-260807 describes providing a webbing guide along this airbag and slidably passing a webbing through this webbing guide. Japanese Unexamined Patent Application Publication No. 2001-260807 describes that this airbag is folded, and is surrounded by an exterior cover made of fabric. During the inflation of the airbag, the sewing thread breaks, and this exterior cover opens.

SUMMARY

In the above conventional occupant restraining apparatus, foreign matter may enter between the webbing guide and the airbag. If foreign matter enters between the webbing guide and the airbag, noise may be generated and the sliding resistance may increase when the webbing guide and the airbag slide on each other.

It is an object of the present invention to prevent, in an occupant restraining apparatus including a webbing, a webbing guide, an airbag, and a bag cover, foreign matter from entering between the webbing guide and the airbag.

An occupant restraining apparatus of the present invention includes a webbing laid along an occupant's body, an inflatable airbag provided along the webbing, a bag cover surrounding the airbag, a webbing guide that is provided along the airbag and through which the webbing is slidably passed, and a tongue that has a webbing insertion port and in which the webbing is passed through the webbing insertion port. The webbing guide extends continuously from one end to the other end of the bag cover. The lower end of the bag cover surrounds the lower end of the webbing guide, and the lower end of the bag cover and the lower end of the webbing guide are bound together. The upper end of the bag cover surrounds the upper end of the webbing guide, and the upper end of the bag cover and the upper end of the webbing guide are bound together.

According to one aspect of the present invention, at the upper ends of the webbing guide and the bag cover, a flat annular portion of a mouth inner is inserted into the webbing guide, and a mouth outer surrounds the bag cover. By connecting the mouth inner and the mouth outer, the webbing guide and the bag cover are sandwiched between the mouth inner and the mouth outer.

According to one aspect of the present invention, the mouth inner and the mouth outer are connected with a fastening member penetrating through the webbing guide and the bag cover.

According to one aspect of the present invention, the mouth outer includes an end portion and a protruding wall that go around end faces of the webbing guide and the bag cover and are engaged with the mouth inner.

According to one aspect of the present invention, at the lower ends of the webbing guide and the bag cover, a base portion of a joint inner is inserted into the webbing guide, and a joint outer surrounds the outer periphery of the webbing guide. A hook is protruded from the joint outer, and a small hole provided at the lower end of the bag cover is engaged with the hook.

According to one aspect of the present invention, the tongue includes a tongue plate, a resin mold that molds the back part of the tongue plate, and a housing that surrounds the resin mold. The joint inner is engaged with the resin mold, and the joint inner and the joint outer are surrounded by the housing.

According to one aspect of the present invention, the resin mold is provided with a stepped portion in an engagement part between the resin mold and the housing. An end of the housing is engaged and in close contact with the stepped portion.

According to one aspect of the present invention, the back inner surface of the webbing insertion port is provided with a plurality of grooves extending in the insertion direction of the webbing.

In the occupant restraining apparatus of the present invention, since the webbing guide extends continuously from one end to the other end of the bag cover, one ends of the webbing guide and the bag cover are bound with a first binding member, and the other ends of the webbing guide and the bag cover are bound with a second binding member, the space between the airbag and the webbing guide is shut off from the surroundings. Therefore, foreign matter is prevented from entering between the airbag and the webbing guide.

DESCRIPTION OF THE EMBODIMENTS

Embodiments of the present invention will now be described with reference to the drawings.

Figure 1:
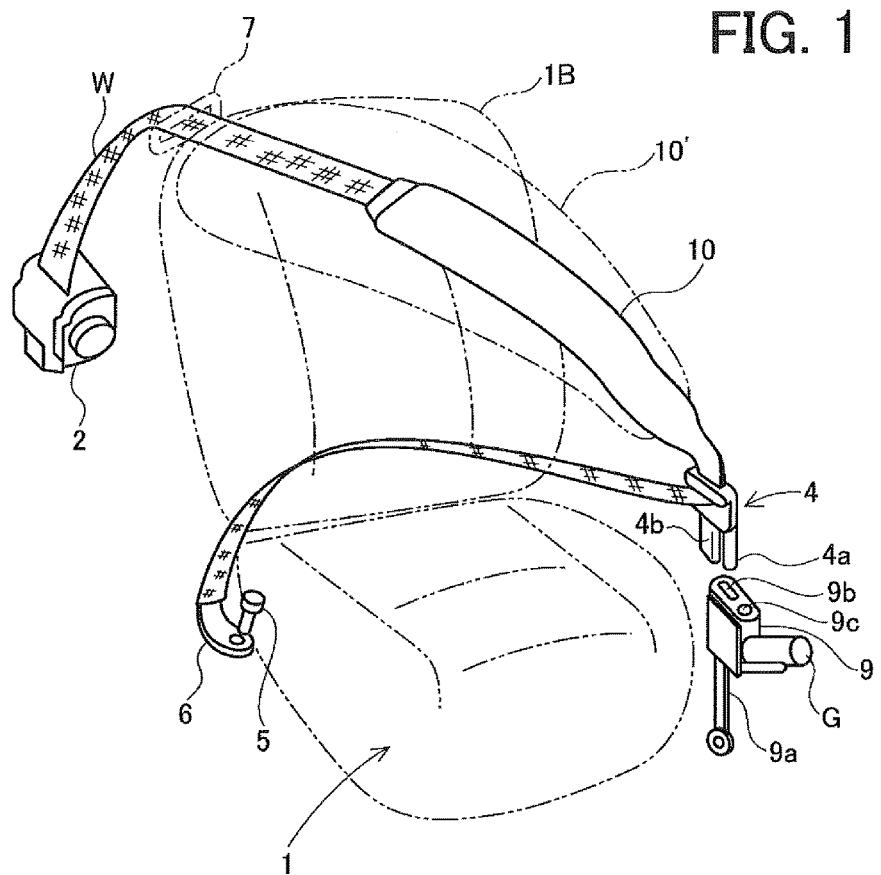
FIG. 1 is a perspective view of an automobile seat equipped with an occupant restraining apparatus according to an embodiment.

FIGS. 1 to 11 illustrate an occupant restraining apparatus according to a first embodiment, and FIG. 1 is a perspective view schematically showing a state where the occupant restraining apparatus (airbelt apparatus) is installed in an automobile front seat 1. A webbing W withdrawn from a retractor 2 is laid through a shoulder anchor 7, and is turned at a tongue 4, and its end is fixed to an anchor plate 6. The anchor plate 6 is fixed to a fixing portion of a vehicle body (not shown) with a fixing bolt 5.

Although the retractor 2 is installed in a B pillar in this embodiment, the retractor 2 is housed in and fixed to a vehicle body part such as a B pillar, a C pillar, or a tray behind the rear seat, or part of a seat such as the inside of a seat back 1B, depending on the seat in which the apparatus is installed.

An airbelt 10 is attached to a part of the webbing W that is closer to the shoulder anchor 7 than the tongue 4. The tongue 4 includes a gas supply pipe 4a and a tongue plate 4b. The gas supply pipe 4a is a cylindrical body made of metal, and communicates with a gas introduction port 21 (FIGS. 8 to 10) at the lower end of the airbag 20 through a gas supply path in the tongue 4 that communicates with the gas supply pipe 4a.

A latch hole 4c (FIGS. 2 and 7) with which a latch member engages when the tongue plate 4b is inserted into a buckle 9 is provided at the front end of the tongue plate 4b of the tongue 4. The back end of the tongue plate 4b is embedded in a resin mold 4d. The resin mold 4d is provided with an insertion port 4e for the webbing W.

As shown in FIG. 1, the buckle 9 to and from which the tongue 4 is attached and detached is fixed to a fixing portion (not shown) of the vehicle body beside the seat with a bracket 9a. A tongue plate supporting hole 9b and a gas supply pipe connecting hole 9c are formed in the buckle 9. When attaching the tongue 4, the tongue plate 4b and the gas supply pipe 4a are inserted into holes 9b and 9c of the buckle 9. A gas jetting port (not shown) of an inflator G installed in the buckle 9 communicates with the gas supply pipe connecting hole 9c into which the gas supply pipe 4a is inserted. During a collision or the like, gas is jetted from the gas jetting port of the inflator G by the reaction of an igniting agent in the inflator G, and the airbelt 10 inflates along the webbing W as shown by long dashed double-short dashed line 10' of FIG. 1.

As shown in FIGS. 2 to 7, the airbelt 10 includes a webbing guide 30 through which the webbing W is passed, the airbag 20 that is folded into an elongate shape and that extends along the webbing guide 30, a bag cover 40 that surrounds the folded body of the airbag 20, a connecting structure portion 50 that connects the lower ends of the webbing guide 30 and the bag cover 40 to the tongue 4, and a mouth inner 60 and a mouth outer 70 that connect the upper ends of the airbag 20, the webbing guide 30, and the bag cover 40 to each other.

Figure 8:
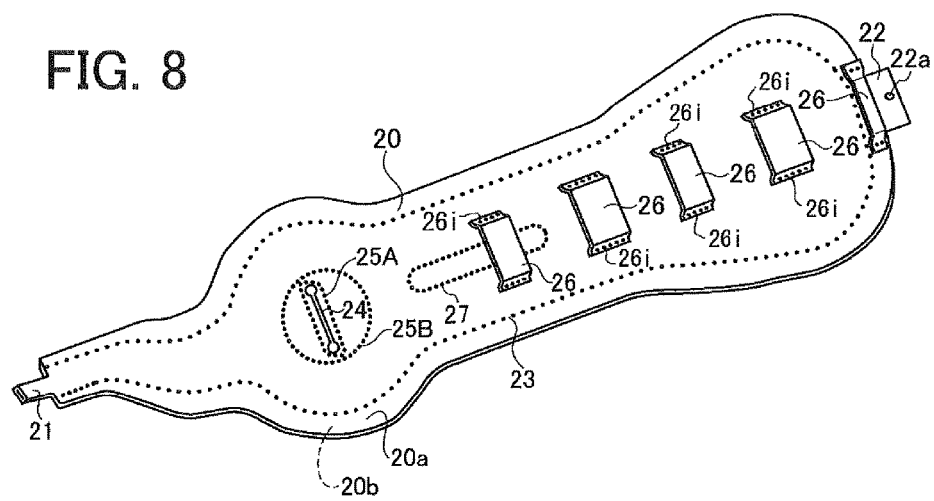
FIG. 8 is a perspective view of the airbag that is flatly spread.

As shown in FIG. 8, the airbag 20 has a gas introduction port 21 at its lower end (closer to the tongue 4). The airbag 20 extends in an elongate shape so as to extend along the webbing W, and its upper end (closer to the shoulder anchor 7) is provided with a protruding piece portion 22. The protruding piece portion 22 is provided with a small hole 22a.

The airbag 20 is made in an elongate bag-like shape by overlaying two elongate base fabrics 20a and 20b, and sewing together their peripheral edges with a sewing thread 23.

In a part of the airbag 20 that is closer to the lower end (closer to the tongue 4) than the longitudinal center, there is provided a slit 24 for passing the webbing guide 30 therethrough from the base fabric 20a side of the airbag 20 to the opposite base fabric 20b side. Sewing with a sewing thread 25A and sewing with a sewing thread 25B are performed so as to sew together the base fabrics 20a and 20b around the slit 24.

A plurality of loop portions 26 for passing the webbing guide 30 are provided spaced apart, from the vicinity of the longitudinal center to the upper end (closer to the protruding piece portion 22) of the airbag 20. The loop portions 26 are made of pieces of fabric, and both side parts thereof are sewn to the base fabric 20a of the airbag 20 with sewing threads 26i.

In the vicinity of the longitudinal center and the vicinity of the lateral center of the airbag 20, sewing with a sewing thread 27 that sews together the base fabrics 20a and 20b is performed. By performing sewing with the sewing thread 27 and the sewing thread 25B, the thickness of the airbag 20 during inflation is limited.

Figure 9:
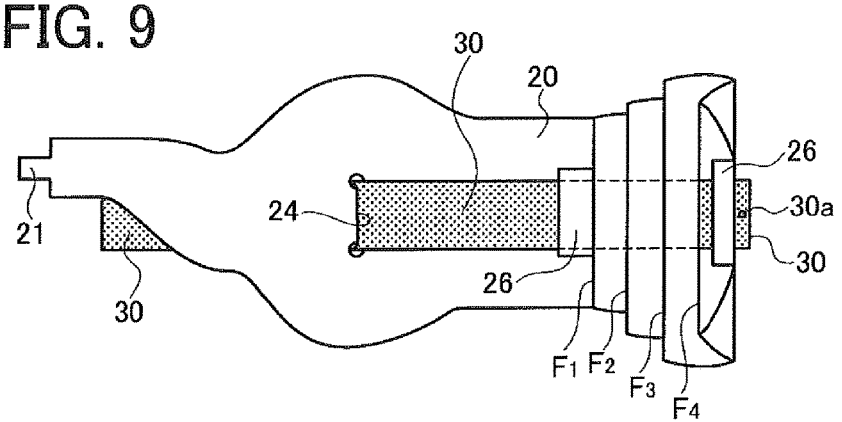
FIG. 9 illustrates the folding of the airbag.

As shown in FIG. 9, the webbing guide 30 is passed between each loop portion 26 and the base fabric 20a, in a direction connecting the slit 24 and the protruding piece portion 22. Although not shown in FIGS. 9 and 10, the webbing W is passed through the webbing guide 30. As shown in FIG. 9, the webbing guide 30 is laid through the loop portions 26 along the base fabric 20a, is then passed through the slit 24 from the base fabric 20a side to the base fabric 20b side, and extends to the vicinity of the gas introduction port 21. The webbing guide 30 extends continuously from the lower end to the other end of the bag cover 40.

The webbing guide 30 has a flat and elongate tubular shape, and is formed of a resin material such as polyurethane resin or silicone elastomer. No holes except small holes 30a described later are provided in the longitudinal side surface of the webbing guide 30, so that if foreign matter enters the inside of the webbing guide 30, the foreign matter does not enter between the airbag 20 and the bag cover 40.

The airbag 20 through the loop portions 26 and the slit 24 of which the webbing guide 30 is passed is made into an intermediate folded body whose entire length is reduced, by folding the protruding piece portion 22 side a plurality of times along fold lines $F_1$ to $F_4$ as shown in FIG. 9.

Figure 10:
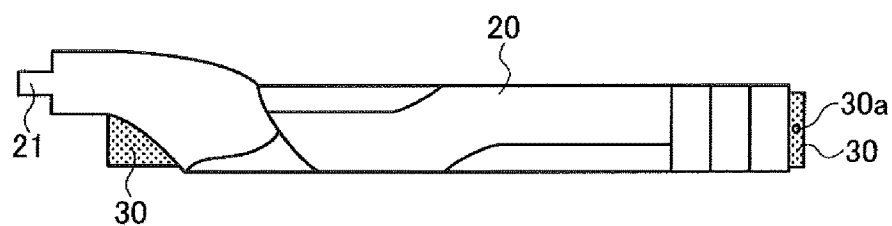
FIG. 10 illustrates the folding of the airbag.

The extending directions of the fold lines $F_1$ to $F_4$ at this time are perpendicular to the longitudinal direction of the airbag 20. This intermediate folded body is folded along fold lines in the longitudinal direction of the airbag 20 so as to wrap the webbing guide 30, and is made into a folded body shown in FIG. 10. In the state of FIG. 10, the gas introduction port 21 and its vicinity protrude upward in FIG. 10. So, although not shown, this protruding part is folded so as to overlap the webbing guide 30, and an elongate folded body having a substantially uniform width as a whole is made.

Figure 2:
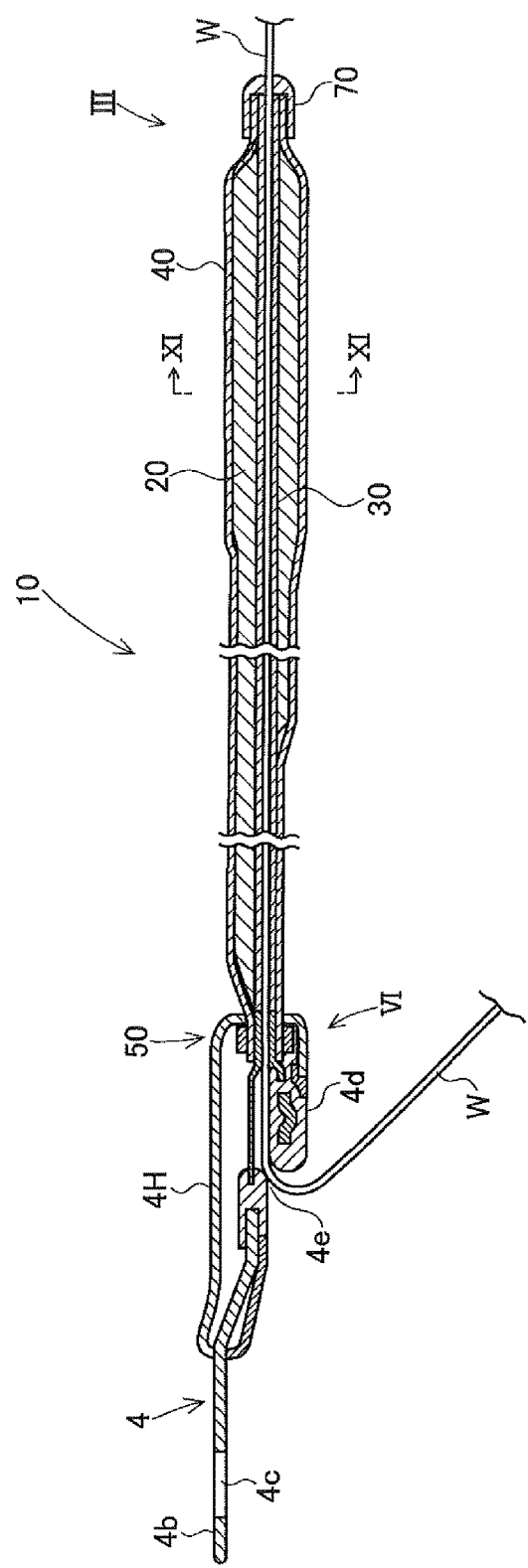
FIG. 2 is a sectional view of the vicinity of a tongue and an airbag of the occupant restraining apparatus according to the embodiment.
Figure 11:
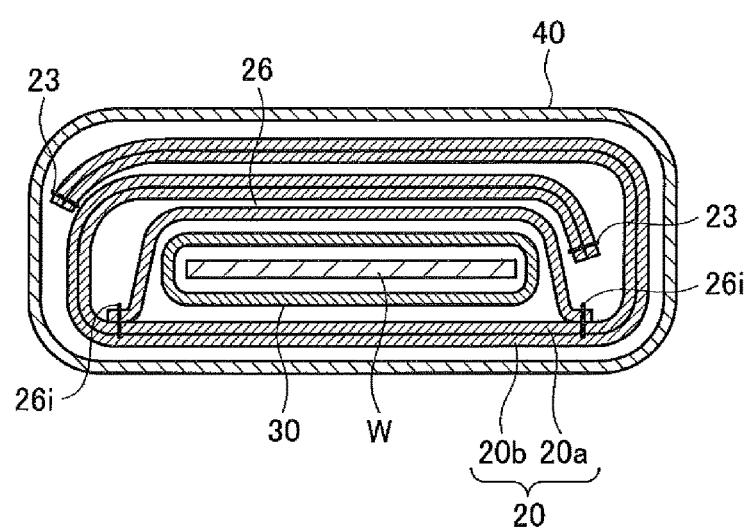
FIG. 11 is a sectional view taken along line XI-XI of FIG. 2.

The folded body of the webbing guide 30 and the airbag 20 is inserted into the bag cover 40 as shown in FIGS. 2 and 11. The bag cover 40 has a flat and elongate tubular shape. The bag cover 40 is sewn with a sewing thread that is broken by the inflation pressure of the airbag 20, or made of stretchy mesh that inflates with the inflation of the airbag 20. In this embodiment, the entire lengths of the webbing guide 30 and the bag cover 40 are equal, and the positions of the lower ends and the other ends thereof coincide.

The binding structure of the upper ends (closer to the shoulder anchor) of the airbag 20, the webbing guide 30, and the bag cover 40 will be described with reference to FIGS. 3 to 5.

Figure 3:
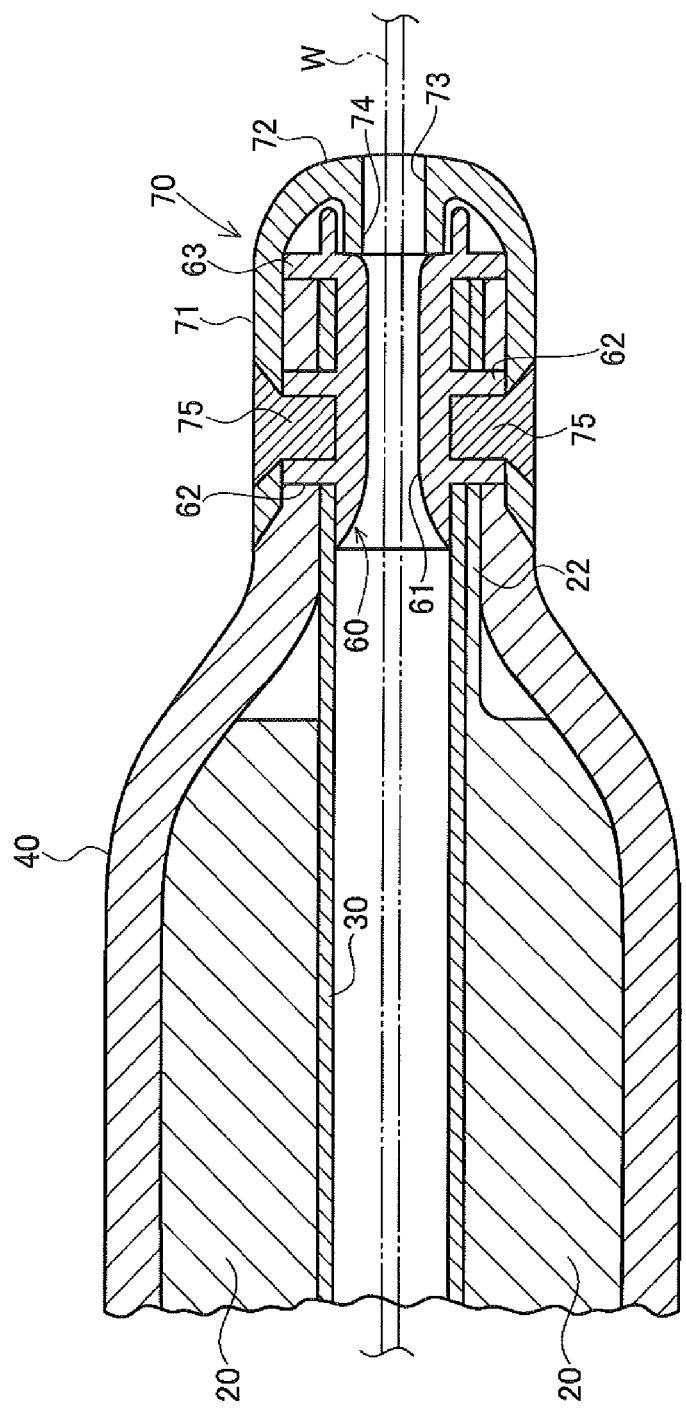
FIG. 3 is an enlarged view of the part III of FIG. 2.
Figure 4:
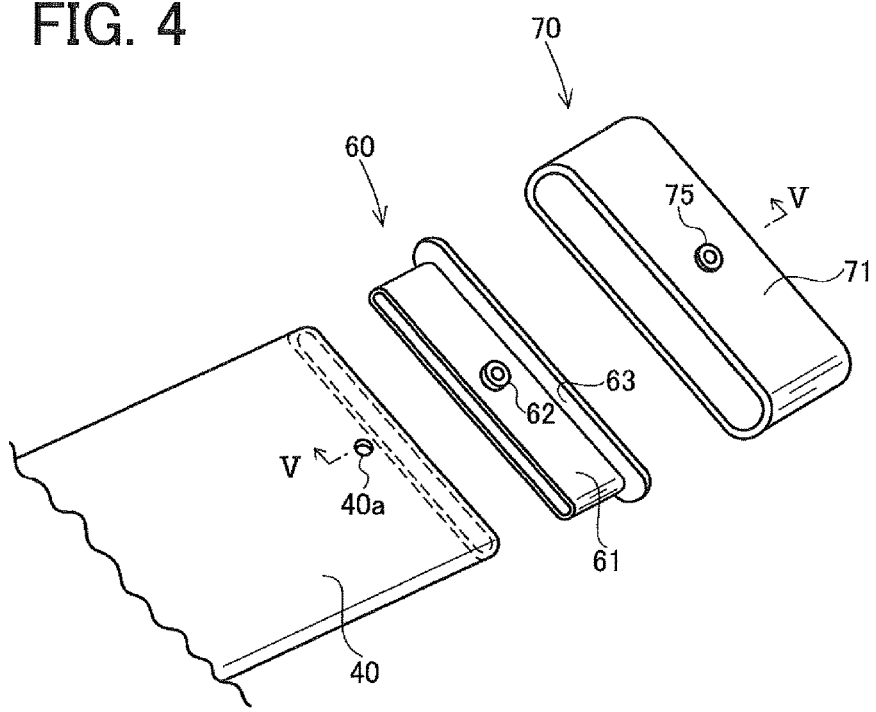
FIG. 4 is an exploded perspective view of an end part of a bag cover.
Figure 5A:
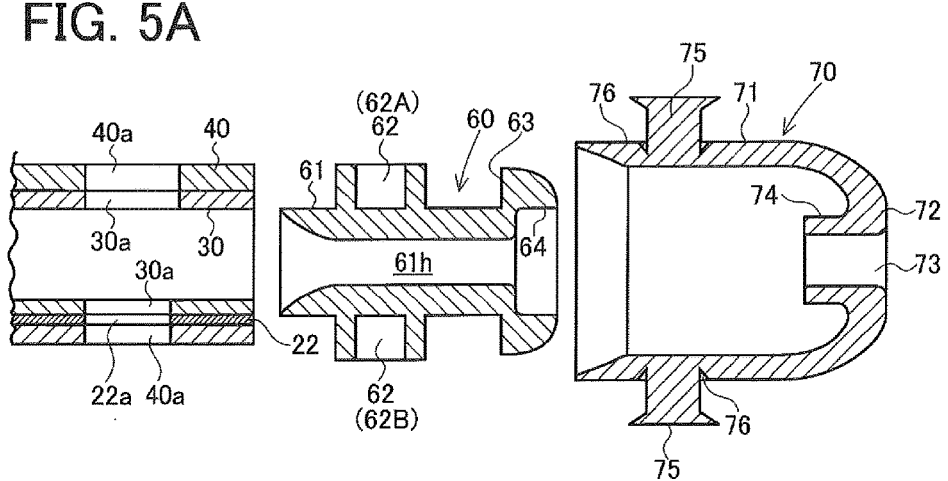
FIG. 5A is a sectional view taken along line V-V of FIG. 4, and FIG. 5B and FIG. 5C illustrate assembling of the end part of the bag cover.
Figure 5B:
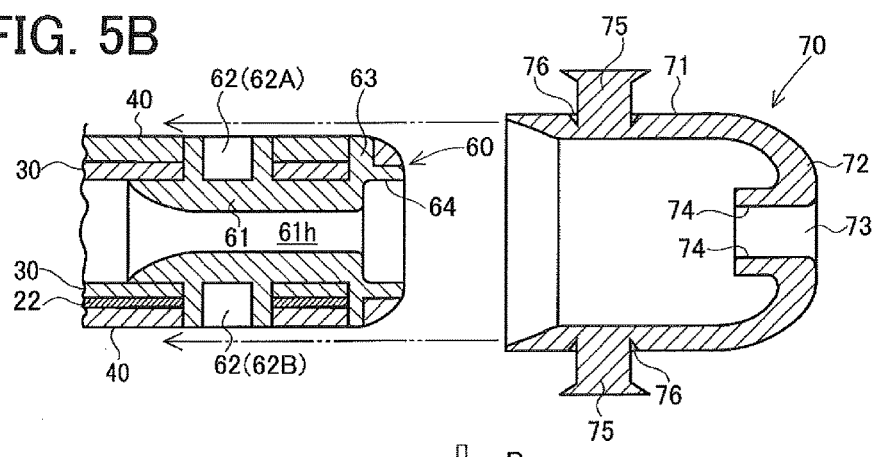

As shown in FIG. 3, the airbag 20 is overlaid on the webbing guide 30, and the bag cover 40 surrounds them. As shown in FIG. 5A and FIG. 5B, the webbing guide 30 and the bag cover 40 are provided with small holes 30a and 40a at positions overlapping the small hole 22a of the protruding piece portion 22 of the airbag 20.

Figure 5C:
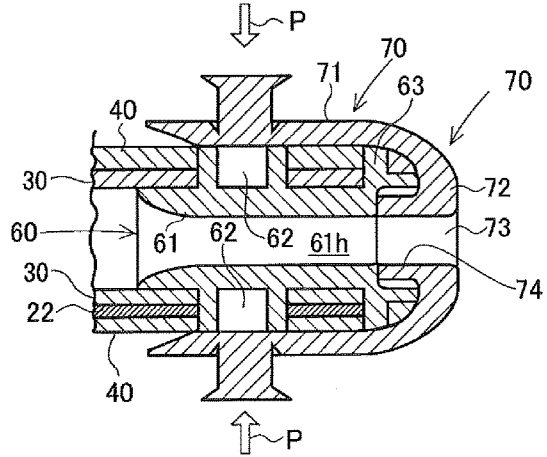

The mouth inner 60 is inserted from the upper end of the webbing guide 30. The mouth inner 60 includes a flat annular portion 61 that is inserted into the webbing guide 30, fitting seats 62 (62A and 62B) that are protruded from the flat annular portion 61 and that have a small diameter cylindrical shape, and a flange portion 63 that is continuous with the back end of the flat annular portion 61. In FIG. 5A to FIG. 5C, the fitting seat 62A is erected upward from the upper surface of the flat annular portion 61, and the fitting seat 62B is erected downward from the lower surface of the flat annular portion 61.

In the back end face of the mouth inner 60, there is provided a recessed portion 64 that is recessed from the flange portion 63 toward the flat annular portion 61 so as to surround an inner hole 61h of the flat annular portion 61. As shown in FIG. 5B, the flat annular portion 61 is inserted into the webbing guide 30 until the flange portion 63 comes into contact with the webbing guide 30, and the small holes 30a and 40a are engaged with the fitting seat 62 (62A). The small hole 30a, the small hole 22a of the protruding piece portion 22 of the airbag 20, and the small hole 40a are engaged with the fitting seat 62 (62B).

Next, as shown in FIG. 5B and FIG. 5C, the mouth outer 70 made of synthetic resin is fitted on the mouth inner 60. The mouth outer 70 includes a flat annular portion 71 having a flat tubular shape, an end portion 72 provided at one end of the flat annular portion 71, a webbing insertion port 73 provided in the end portion 72, and a protruding wall 74 protruding from the edge of the webbing insertion port 73 toward the inside of the flat annular portion 71.

Push-in pins 75 that are pushed in toward the fitting seats 62 of the mouth inner 60 are protruded outward from the flat annular portion 71. The push-in pins 75 are formed integrally with the mouth outer 70. Recessed grooves 76 are provided around the bases of the push-in pins 75. When the push-in pins 75 are pushed in the directions of arrows P, as shown in FIG. 3, the flat annular portion 71 is sheared along the recessed grooves 76, and the push-in pins 75 are pushed into the fitting seats 62. The mouth inner 60 and the mouth outer 70 are thereby connected, and the webbing guide 30, the protruding piece portion 22 of the airbag 20, and the bag cover 40 are sandwiched between the mouth inner 60 and the mouth outer 70. The connection between the mouth inner 60 and the mouth outer 70 is not limited to that using the push-in pins 75, and may be that using fastening members such as screws or rivets, or may be that using a connecting method such as bonding or welding.

Since, as described above, the upper ends of the airbag 20, the webbing guide 30, and the bag cover 40 are sandwiched between the mouth inner 60 and the mouth outer 70, and mating faces (end faces) of them are surrounded by the mouth inner 60 and the mouth outer 70, foreign matter is prevented from entering between the airbag 20 and the bag cover 40.

In particular, in this embodiment, since the fitting seats 62 enter the small holes 22a, 30a, and 40a of the airbag 20, the webbing guide 30, and the bag cover 40, the connecting strength between the airbag 20, the webbing guide 30, and the bag cover 40, and the mouth inner 60 and the mouth outer 70 is high.

The connecting structure portion 50 between the webbing guide 30, the lower end (closer to the tongue 4) of the bag cover 40, and the tongue 4 will be described with reference to FIGS. 2, 6, and 7. FIG. 7 is an exploded view as seen from arrow VII of FIG. 6.

The connecting structure portion 50 includes a joint inner 80, a joint outer 90, and a housing 4H that surrounds them and the back part of the tongue 4.

Figure 6:
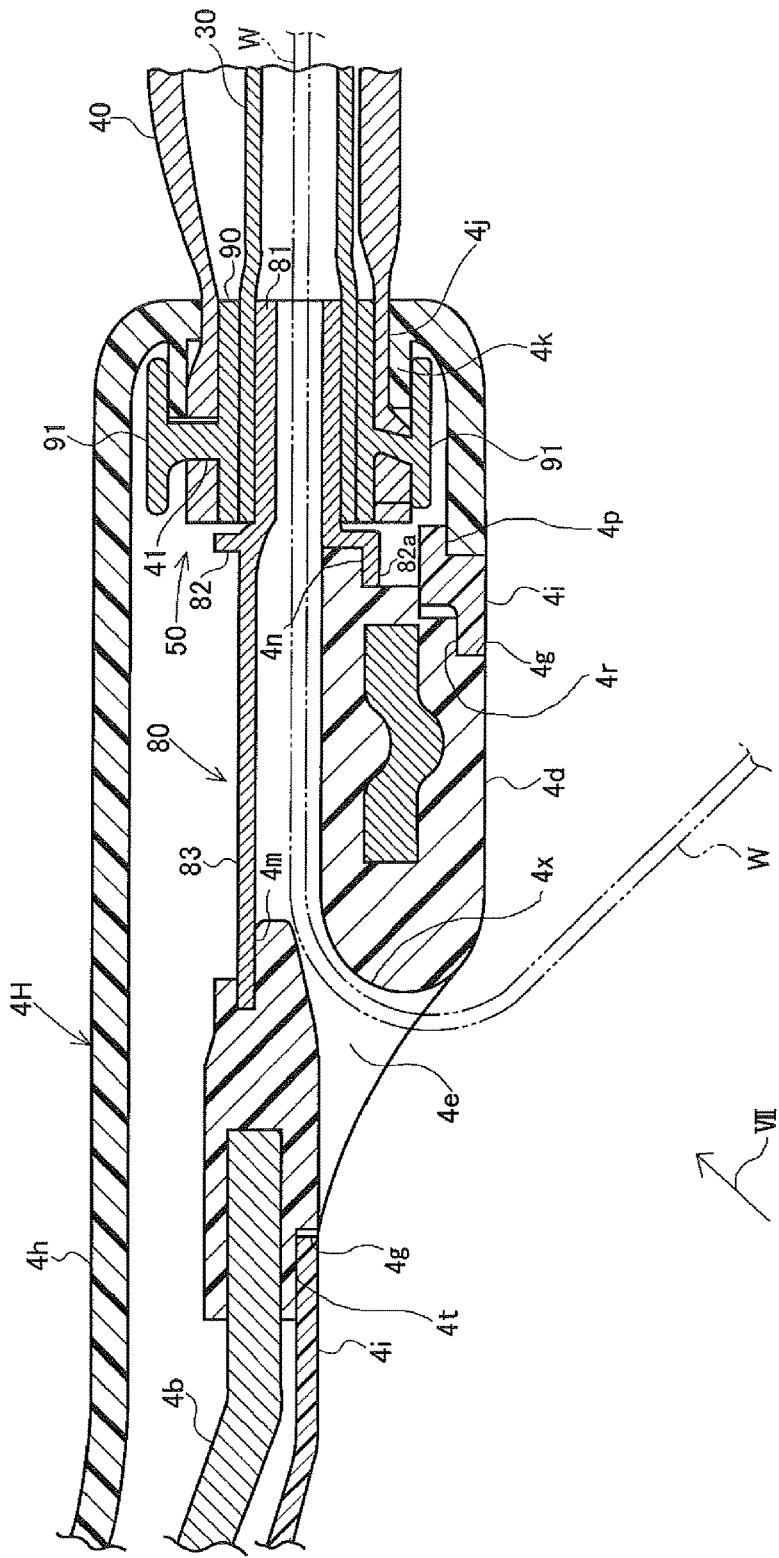
FIG. 6 is an enlarged view of the part VI of FIG. 2.
Figure 7:
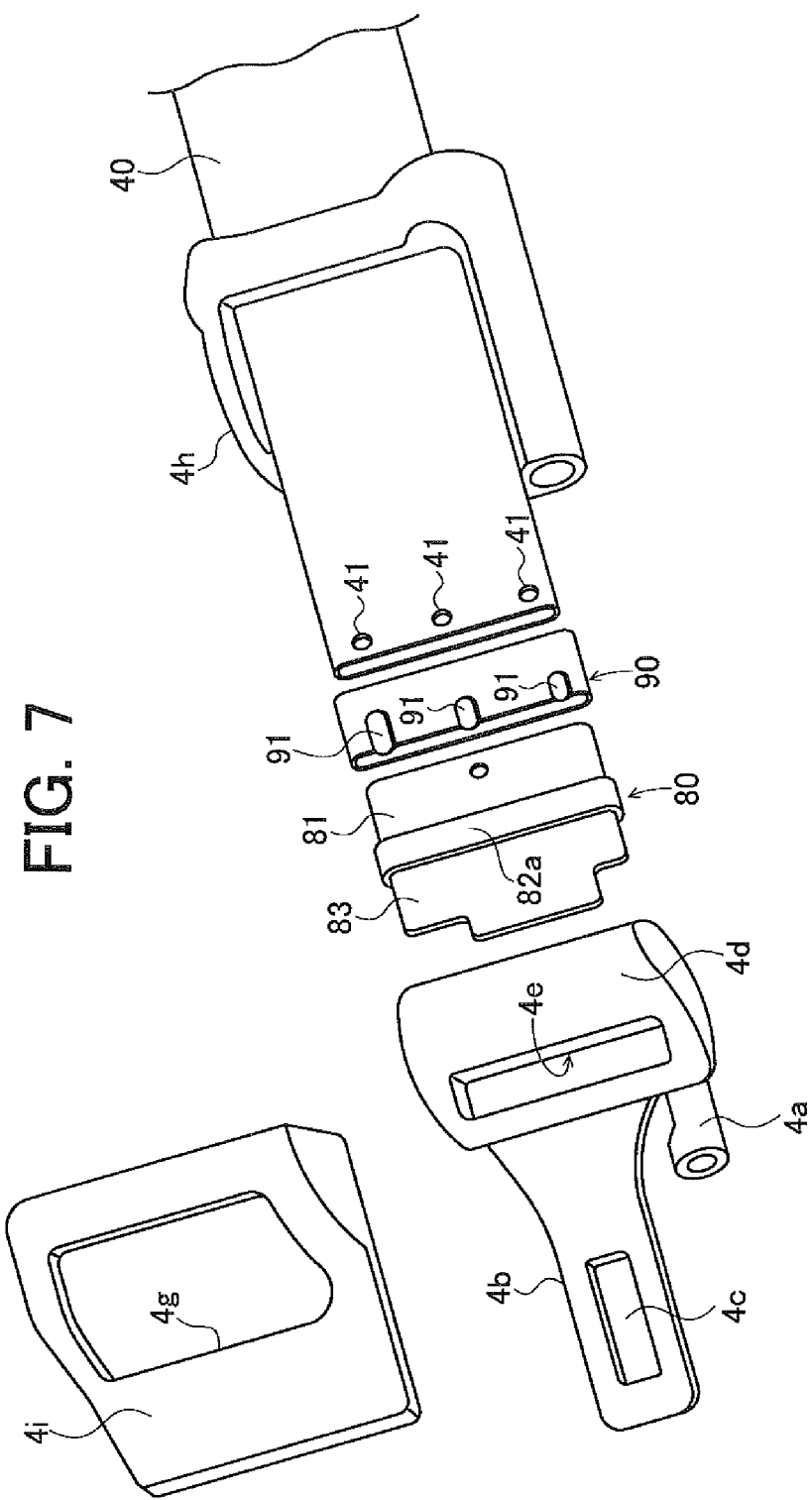
FIG. 7 is an exploded perspective view of a connecting part between the bag cover and the tongue.

As shown in FIGS. 6 and 7, the housing 4H consists of two bodies: a housing upper 4h and a housing lower 4i, and sandwiches the resin mold 4d and the tongue plate 4b in the vicinity thereof.

The housing lower 4i is provided on a surface that faces the occupant in the seat 1 when the tongue 4 is attached to the buckle 9 beside the seat 1. The housing lower 4i is provided with an opening 4g. A part of the resin mold 4d that is in the vicinity of the webbing insertion port 4e faces the opening 4g.

An opening 4j that receives the webbing guide 30 and the bag cover 40 is provided at the back end of the housing upper 4h, and an erected wall 4k is erected from the edge of the opening 4j.

As shown in FIGS. 6 and 7, the joint inner 80 includes a base portion 81 having a flat annular shape, a protruding portion 83 protruding from the base portion 81 toward the front end of the tongue, and a flange portion 82 erected from the border between the base portion 81 and the protruding portion 83. The base portion 81 of the joint inner 80 is inserted into the inside of the lower end of the webbing guide 30. The joint inner 80 is inserted into the webbing guide 30 until the lower end of the webbing guide 30 comes into contact with the flange portion 82.

The joint outer 90 is fitted on the lower end of the webbing guide 30 fitted on the base portion 81 of the joint inner 80, and the lower end of the webbing guide 30 is sandwiched between the joint outer 90 and the base portion 81 of the joint inner 80. The webbing guide 30 is thereby connected to the joint inner 80.

The joint outer 90 has a flat annular shape that is slightly larger than the base portion 81. A plurality of hooks 91 are erected from the outer surface of the joint outer 90. Small holes 41 to be engaged with the hooks 91 are provided in the vicinity of the lower end of the bag cover 40. After engaging the small holes 41 with the hooks 91, the joint inner 80 is engaged with the resin mold 4d of the tongue 4. Next, the housing upper 4h and the housing lower 4i that are preliminarily disposed are assembled so as to sandwich the resin mold 4d, and they are connected and integrated by hook attachment, screw fastening, ultrasonic welding, or the like.

The erected wall 4k of the housing upper 4h engages with the hooks 91. The front end of the protruding portion 83 of the joint inner 80 is in close contact with a stepped portion 4*m* of the resin mold 4*d* in the vicinity of the webbing insertion port 4*e*. A protruding portion 82*a* of the flange portion 82 of the joint inner 80 is in close contact with a stepped portion 4*n* at the back end of the resin mold 4*d*.

An end edge portion of the housing upper 4*h* is engaged and in close contact with a stepped portion 4*p* provided at the back end of the housing lower 4*i*. The back edge of the opening 4*g* of the housing lower 4*i* is engaged and in close contact with a stepped portion 4*r* provided in the resin mold 4*d*. The front edge of the opening 4*g* of the housing lower 4*i* is engaged and in close contact with a stepped portion 4*t* in the front of the resin mold 4*d*.

Since, as described above, the lower end of the webbing guide 30 is sandwiched between the joint inner 80 and the joint outer 90, and the mating faces of the webbing guide 30 and the bag cover 40 are hermetically surrounded by the tongue housing 4H, foreign matter is prevented from entering between the mating faces of the lower ends of the webbing guide 30 and the bag cover 40. In addition, since the front edge of the opening 4*g* of the housing lower 4*i* is engaged with the stepped portion 4*t* of the resin mold 4*d*, and the back edge of the opening 4*g* is engaged with the stepped portion 4*r*, the connecting strength between the housing lower 4*i* and the housing upper 4*h* and the resin mold 4*d* is high, and the occurrence of gap due to the deformation of the housing 4H can be prevented.

Figure 12:
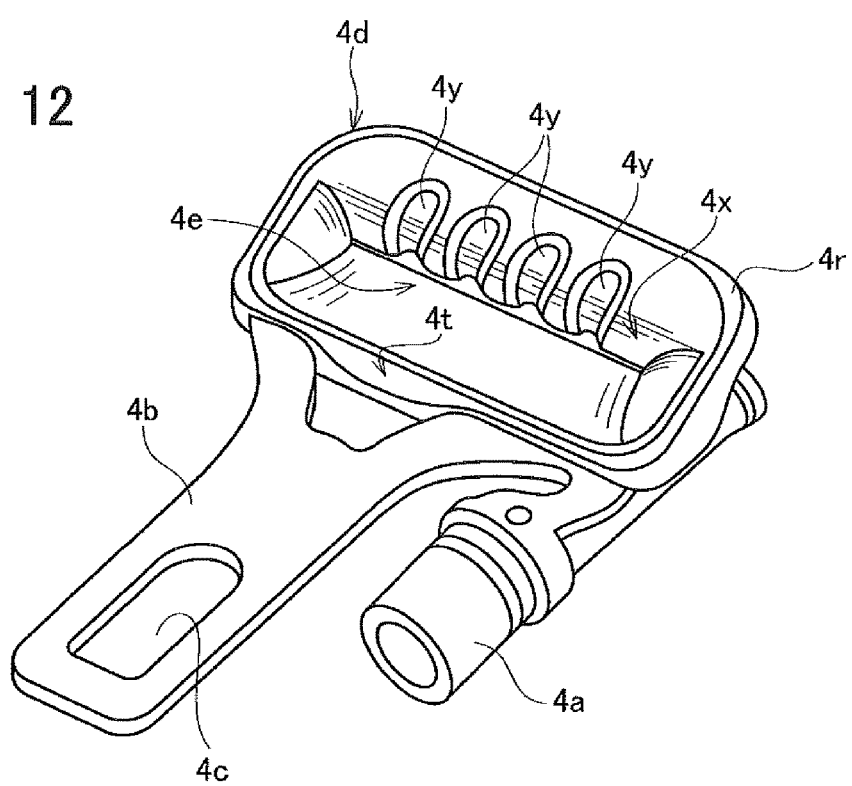
FIG. 12 is a perspective view showing another form of a resin mold integrated with a tongue plate.

In the tongue 4 of the above embodiment, as shown in FIGS. 6 and 7, the back inner surface 4*x* (FIG. 6) of the webbing insertion port 4*e* is uniform in the width direction of the webbing W. However, as shown in FIG. 12, the back inner surface 4*x* of the webbing insertion port 4*e* may be provided with a plurality of grooves 4*y* extending in the insertion direction of the webbing W. The grooves 4*y* extend parallel to each other. If such grooves 4*y* are provided, the webbing W is prevented or suppressed from sliding in the width direction in the webbing insertion port 4*e* (jamming).

In other respects, the configuration of the tongue of FIG. 12 is the same as the configuration of the tongue of the above embodiment, and the same reference sign denote the same parts.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An occupant restraining apparatus comprising:
   a webbing configured to lay along an occupant's body;
   an inflatable airbag provided along the webbing;
   a bag cover surrounding the airbag;
   a webbing guide that is provided along the airbag and through which the webbing is slidably passed; and
   a tongue that has a webbing insertion port and in which the webbing is passed through the webbing insertion port,
   wherein the webbing guide extends continuously from one end to the other end of the bag cover,
   wherein the lower end of the bag cover surrounds the lower end of the webbing guide, and the lower end of the bag cover and the lower end of the webbing guide are bound together, and
   wherein the upper end of the bag cover surrounds the upper end of the webbing guide, and the upper end of the bag cover and the upper end of the webbing guide are bound together.

2. The occupant restraining apparatus according to claim 1,
   wherein at the upper ends of the webbing guide and the bag cover, a flat annular portion of a mouth inner is inserted into the webbing guide, and a mouth outer surrounds the bag cover, and
   wherein by connecting the mouth inner and the mouth outer, the webbing guide and the bag cover are sandwiched between the mouth inner and the mouth outer.

3. The occupant restraining apparatus according to claim 2, wherein the mouth inner and the mouth outer are connected with a fastening member penetrating through the webbing guide and the bag cover.

4. The occupant restraining apparatus according to claim 2, wherein the mouth outer includes an end portion and a protruding wall that go around end faces of the webbing guide and the bag cover and are engaged with the mouth inner.

5. The occupant restraining apparatus according to claim 1,
   wherein at the lower ends of the webbing guide and the bag cover, a base portion of a joint inner is inserted into the webbing guide, and a joint outer surrounds the outer periphery of the webbing guide, and
   wherein a hook is protruded from the joint outer, and a small hole provided at the lower end of the bag cover is engaged with the hook.

6. The occupant restraining apparatus according to claim 5,
   wherein the tongue includes a tongue plate, a resin mold that molds the back part of the tongue plate, and a housing that surrounds the resin mold, and
   wherein the joint inner is engaged with the resin mold, and the joint inner and the joint outer are surrounded by the housing.

7. The occupant restraining apparatus according to claim 6,
   wherein the resin mold is provided with a stepped portion in an engagement part between the resin mold and the housing, and
   wherein an end of the housing is engaged and in close contact with the stepped portion.

8. The occupant restraining apparatus according to claim 1, wherein the back inner surface of the webbing insertion port is provided with a plurality of grooves extending in the insertion direction of the webbing.

* * * * *